Figure 1:
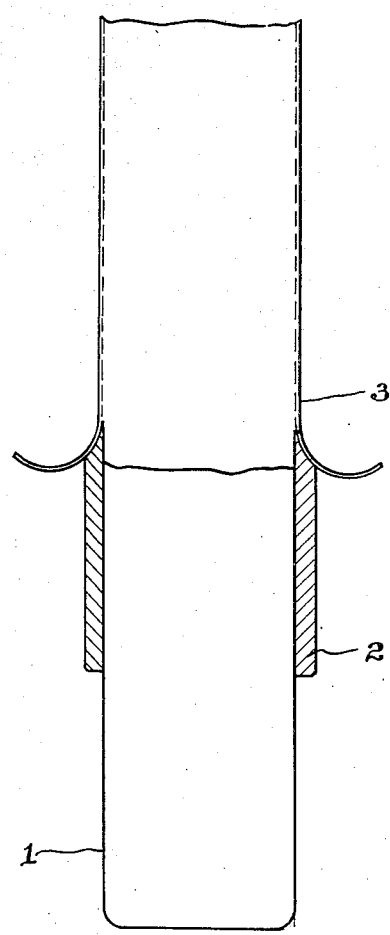

Jan. 31, 1928.

J. WESTLY 1,657,948

PROCESS IN THE EMPLOYMENT OF SELF BAKING ELECTRODES

Filed Jan. 5, 1925

Inventor
Jens Westly

By
L. Corsey H. Cole
Attorney

Patented Jan. 31, 1928.

1,657,948

UNITED STATES PATENT OFFICE.

JENS WESTLY, OF KRISTIANSAND, NORWAY, ASSIGNOR TO DET NORSKE AKTIE-SELSKAB FOR ELEKTROKEMISK INDUSTRI OF NORWAY, OF OSLO, NORWAY.

PROCESS IN THE EMPLOYMENT OF SELF-BAKING ELECTRODES.

Application filed January 5, 1925, Serial No. 713, and in Norway January 17, 1924.

"Self-baking" electrodes (electrodes which are baked in the furnace in which they are used) provided with metallic mantle are described in United States Patent No. 1,440,724. The mantle has here the function of acting as a mould during the introduction of the mass, of protecting the electrode against oxidation and transmitting the current to the electrode. It is often desirable to provide the electrode with ribs or similar extensions projecting into the electrode mass and further facilitating the flow of the current. In the use of the electrode the mantle and ribs ordinarily melt in the furnace and the metal contained therein enters into the furnace product.

Usually electrodes contain, according to their size and the current carried, about 4–10% metal, generally iron. The amounts of iron supplied in this way to the furnace are as a rule so small that they do not interfere with the working of the furnace or lower the quality of the product. In some cases it may, however, be of importance to avoid or at least to minimize the introduction of iron, as for instance in using the electrode in furnaces for the production of aluminium in which about 6–700 kg. of electrodes are consumed per ton of aluminium. This would cause the aluminium to take up about 3–3.5% iron from the mantle if the electrode contains 5% iron, and thus the quality of the aluminium produced would be greatly lowered. It is therefore of great importance for the employment of the electrode in these furnaces that a method be found to avoid introduction of considerable quantities of iron or other detrimental metals into the aluminium. This may be accomplished by making the mantle and ribs of aluminium. Iron, however, on account of its high melting point and its cheapness has important advantages as compared with aluminium, wherefore if possible iron would preferably be employed. Applicant has found that this is possible by employing the method hereinafter described, and illustrated in the drawing.

Figure 2:
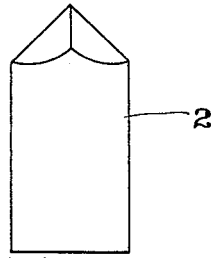

In the drawing Figure 1 represents an elevational view partially in section showing an electrode and holder utilizing the method, and Figure 2 represents an elevational view of a portion of the holder.

The method consists in removing the metal mantle from the electrode before it reaches far enough down into the furnace so that the mantle melts off. It is then desirable to employ a mantle of the smallest possible thickness; for instance with iron plates a thickness of 0.3–0.4 mm. The mantles may then without difficulty be torn or cut away in pieces from the electrode as the electrode during its use is lowered into the furnace. It is desirable to arrange things so that the electrode holder is placed on the baked part of the electrode as far as possible. Whether this is possible depends on the temperature in the furnace, size of the electrode and the current carried. Under favourable circumstances the heat may, if conditions are rightly chosen, be drawn so high up in the electrode that it is already sufficiently baked before it enters the holder and the mantle may be removed there. Otherwise the mantle may be conveniently removed at the lower edge of the electrode holder, for instance in the form of strips 5–10 cm. broad. To facilitate the tearing off, arrangements may be made to give a sharp lower edge to the electrode holder, thus causing it to act as a knife. Further the mantle may be scored horizontally at intervals of 5–10 cm., to facilitate the tearing operation. The tearing operation may preferably be repeated each time the holder is moved.

In the application of the self-baking electrodes herein referred to it is often advantageous to employ ribs. These can, however, only with difficulty be removed by tearing off and as far as the ribs are concerned one has the choice between letting the amount of iron or other detrimental metal corresponding to the length of the ribs pass into the furnace, or making the ribs of aluminium or other non-detrimental metal or metal alloy. To be able to employ iron in the ribs the size of the ribs must then in aluminium furnaces be reduced to the minimum. Preferably the holder is as far as possible placed on baked carbon, giving the most direct passage of the current from mantle to the electrode mass below the holder without passing through the ribs. The ribs may therefore be greatly reduced and in practice it has been possible to reduce the amount of iron in the ribs so much that the aluminium produced only takes up 0.05–0.1% iron from the ribs even if these are allowed to melt down and entirely enter the aluminium. As an example it may be mentioned that an electrode with 1 meter diameter and for a capacity of 1 ampere per square centimeter was made with 8 ribs 7 centimeters broad. Both ribs and mantle were of 0.3 mm. plate. The mantle was during its use removed before it entered into the bath. But the ribs were allowed to melt and enter the metal produced, which thus took up 0.074% iron.

In the cases when the mantle is removed before it gets down into the gripping members of the holder these may be so made as to scale off the metal mantle. For instance as shown in the appended drawing. 1 is the electrode, 2 is a part of the holder and 3 shows the mantle which is forced out from the electrode by means of plough-shaped holder parts. The mantle parts which are forced out may be torn or cut away or allowed to burn off.

The metal mantle will always stand out a little from the electrode when this is baked. The electrode shrinks during the baking and the metal mantle expands. If the metal mantle is thin beforehand it will also be more or less oxidized and brittle so it may easily be scaled off against the sharp upper edge of the gripping members of the holder when the electrode is lowered.

Together with the mantle the detrimental layer of dust is also removed thus giving a clean contact between gripping members and electrode.

I claim:

1. In the process of manufacturing and using self-baking electrodes, where the electrode is formed and baked within a protecting metal mantle, the step comprising from time to time removing portions of the mantle from the baked end of the electrode before such portions become melted.

2. In the process of manufacturing and using self-baking electrodes, where the electrode is formed and baked within a protecting metal mantle, the step comprising from time to time removing portions of the mantle from the baked end of the electrode in such a manner as to reduce the amount of foreign metal entering the furnace, and at the same time protect the electrode during the baking period.

3. In the process of manufacturing and using self-baking electrodes, where the electrode is formed and baked within a protecting metal mantle, the step comprising removing a portion of the mantle above the point where it would melt and enter the furnace charge.

4. In the process of manufacturing and using self-baking electrodes, where the electrode is formed and baked within a protecting metal mantle, the step comprising removing a portion of the mantle below the electrode holder and above the point where it would melt and enter the furnace charge.

JENS WESTLY.